(12) United States Patent
Ahmad et al.

(10) Patent No.: US 8,075,279 B2
(45) Date of Patent: Dec. 13, 2011

(54) COATED TURBINE BLADE

(75) Inventors: Fathi Ahmad, Kaarst (DE); Michael Dankert, Offenbach (DE)

(73) Assignee: Siemens Aktiengesellschaft, Munich (DE)

( * ) Notice: Subject to any disclaimer, the term of this patent is extended or adjusted under 35 U.S.C. 154(b) by 1146 days.

(21) Appl. No.: 11/895,259

(22) Filed: Aug. 23, 2007

(65) Prior Publication Data
US 2008/0232971 A1 Sep. 25, 2008

(30) Foreign Application Priority Data
Aug. 23, 2006 (EP) ..................... 06017532

(51) Int. Cl.
*B64C 11/24* (2006.01)
(52) U.S. Cl. ............... 416/241 B; 416/233; 416/236 R
(58) Field of Classification Search ............... 416/95, 416/96 A, 97 R, 224, 223 R, 228, 229 R, 416/229 A, 231 B, 231 R, 232, 233, 235, 416/236 R, 241 R, 241 A, 241 B
See application file for complete search history.

(56) References Cited

U.S. PATENT DOCUMENTS

| 4,643,647 | A | * | 2/1987 | Perry | 416/230 |
| 5,690,473 | A | * | 11/1997 | Kercher | 416/97 A |
| 5,913,661 | A | * | 6/1999 | Panovsky et al. | 416/229 A |
| 7,845,905 | B2 | * | 12/2010 | Ahmad et al. | 416/96 R |

FOREIGN PATENT DOCUMENTS

| EP | 0 139 396 A1 | 5/1985 |
| WO | WO 00/12868 A1 | 3/2000 |
| WO | WO 00/25005 A1 | 5/2000 |

* cited by examiner

*Primary Examiner* — Edward Look
*Assistant Examiner* — Ryan Ellis

(57) ABSTRACT

The invention refers to a coated turbine blade for a gas turbine, having blade walls divided into sections with locally adapted material temperatures. The cooler material temperatures of the blade walls are at the points where the support ribs merge into the blade walls. The regions with higher material temperatures of the blade walls are at the positions where cavities are arranged inside the blade walls. This is achieved via a ceramic thermal barrier coating having different layer thicknesses that allow different material temperatures. The region of the surface of the blade wall which faces the working medium and lies opposite an internal rib has a thicker thermal barrier coating than a region of the surface of the blade wall which is cooled via a cooling medium that flows in the cavities. This results in homogenization of the material temperature in the connecting regions, which results in prolonged blade life.

14 Claims, 1 Drawing Sheet

COATED TURBINE BLADE

CROSS REFERENCE TO RELATED APPLICATIONS

This application claims priority of European application No. 06017532.0 filed Aug. 23, 2006, which is incorporated by reference herein in its entirety.

FIELD OF INVENTION

The invention refers to a coated turbine blade.

BACKGROUND OF THE INVENTION

Such turbine blades are generally known. They have an airfoil section which is subjected to flow of a hot working medium and extends from a leading edge to a trailing edge. The airfoil section in this case is formed by a blade wall on the suction side and a blade wall on the pressure side and is provided with a coating on its outer surface which faces the hot working medium. The coating serves as a thermal barrier coating in order to minimize the heat yield from the hot working medium to the material of the airfoil section, so that this can withstand the mechanical and thermal stresses for a predetermined service life. Although this coating, for example a ceramic APS thermal barrier coating, protects the turbine blade material, cracks can occur in the blade material as wear phenomena, which shorten the service life of the component and which can endanger the operation of the gas turbine with the absence of countermeasures.

SUMMARY OF INVENTION

The object of the invention, therefore, is the provision of a turbine blade of the generic type, the service life of which and the wear performance of which is further improved.

The object upon which the invention is based is achieved by means of a turbine blade and is equipped with the features described in claims.

The invention is based on the knowledge that in the turbine blade of the generic type, which inside can be subjected to a through-flow of cooling medium, high material temperatures occur along the blade walls of the airfoil section, viewed from the leading edge to the trailing edge, whereas in the ribs which are present inside the airfoil section and serve for supporting the two blade walls, significantly lower material temperatures arise during operation. On account of these influences, large temperature differences come into conflict in the connecting region of the ribs and blade walls which merge into each other, which temperature differences can lead to cracks at this point. In order to avoid these especially high temperature gradients, the invention proposes that the coating in at least one of the regions of the outer surface, which lies opposite each of the connecting regions, has a greater layer thickness than the other regions of the outer surface of the blade walls, which blade walls define a cavity inside. At the points with thicker coating, only a lower heat yield then takes place. This leads to a homogenization of the material temperature and to a reduction of the temperature gradients in the connecting region, as a result of which lower temperature-induced stresses occur in the material. An increased service life of the turbine blade can be achieved, since cracks in the connecting region occur less frequently or their propagation takes place only with delayed action, as the case may be.

On account of the locally thicker coating, especially a thicker ceramic thermal barrier coating, in this way a homogenization of the material temperatures can be achieved in each connecting region which is formed according to the invention, which affects the service life of the turbine blade with prolonging effect. The turbine blade in this case can be formed as a stator blade or as a rotor blade.

Further advantageous developments of the invention are disclosed in the dependent claims.

The invention is especially of particular effect when a cooling medium is flowable inside the airfoil section. In this case, the support rib, if necessary even on both sides, is especially efficiently cooled, although this leads to far greater temperature gradients in the connecting region. To that effect, the measure according to the invention for matching the material temperatures and for prolonging the service life, especially for such a turbine blade, is practical.

If the thicker coating in the form of comparatively small bumps projects outwards from the thinner coating, the hot working medium which flows past it could be swirled. This negligible turbulence, however, leads only to a slight local increase of the heat transfer coefficient on the hot gas side, which is harmless for the turbine blade. Since, however, customarily on account of the coating behavior, a step-like raising of the layer thickness is anyway not possible, but only a continuous increase or a continuous decrease of the layer thickness, this has no negative influence on the invention.

According to a further development of the invention, the airfoil section is formed by a basic body, to which the coating is applied. The basic body, which is cast for example, has recesses in the regions in which the coating is to have the greater layer thickness. Each recess, in a preferred manner, is deep to such an extent that it approximately corresponds to the difference between the thicker and the thinner coating in order to achieve in this way an especially aerodynamic and step-free, i.e. smooth surface of the coating which is subjected to flow of the working medium. Since the coating as a rule has a layer thickness of 200 µm to 600 µm, and the factor between thinner coating and thicker coating is in the order of magnitude of at least 11.1 or at least 1.2, these recesses as a rule are not deeper than 120 µm.

In a special development of the invention, the blade wall on the suction side and the blade wall on the pressure side converge in the region of a trailing edge, wherein the coating in this region is thicker than in the region which lies upstream directly in front of it. Also here, hotter blade wall regions adjoin cooler material regions inside, so that the reduction according to the invention of material stresses can also be effected at this point.

BRIEF DESCRIPTION OF THE DRAWINGS

The effects of the features of the invention are explained in detail with reference to an exemplary embodiment. In the drawing.

Identical features are provided with the same designations. To the extent of not being referred to explicitly, the identical features also lead to the same effects.

DETAILED DESCRIPTION OF INVENTION

Figure 1:
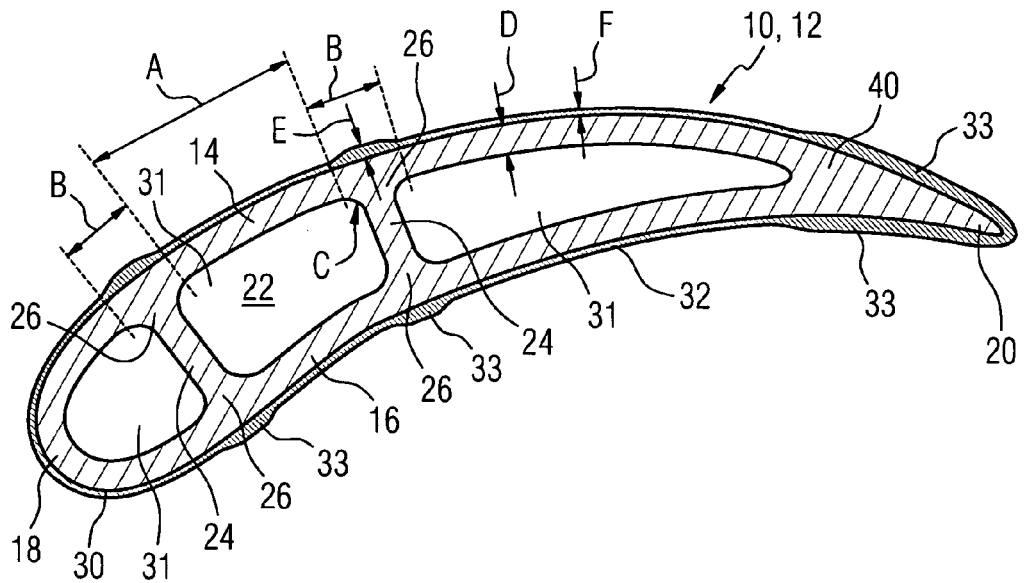
FIG. 1 shows a cross section through a blade section according to the invention in a first development.

In FIG. 1, the cross section through an airfoil section 10 of a turbine blade 12 according to the invention is shown. The turbine blade 12 is preferably used in a stationary gas turbine which is subjected to axial through-flow. However, it can also be used, for example, in aircraft gas turbines. The airfoil section 10 is formed by a blade wall 14 on the suction side and a blade wall 16 on the pressure side, which extend in each case from a leading edge 18 to a trailing edge 20. The airfoil section 10, moreover, has support ribs 24 which are arranged inside 22, and connect the blade wall 16 on the pressure side to the blade wall 14 on the suction side, as a result of which the rigidity of the airfoil section 10 is increased. Each support rib 24 merges into the blade walls 14, 16 in a connecting region 26, increasing the wall thickness D of these blade walls. The blade wall 14 on the suction side and the blade wall 16 on the pressure side meet in the region of the trailing edge 20, so that in this region, in the direction of the trailing edge 20, initially an especially large, common wall thickness D exists which continuously decreases as the distance to the trailing edge 20 becomes smaller.

The blade walls 14, 16 on their outer surface 30 which faces a working medium, have a coating 32 which can especially be a ceramic thermal barrier coating. This, for example, can have been applied in the APS process. Alternatively to this, the thermal barrier coating can also have been applied to the basic body 40 in the plasma spraying process or in comparable methods. The coatings 32, moreover, can also be multilayered as a layered system and can additionally comprise an anti-corrosion layer.

Both the blade wall 14 on the suction side and the blade wall 16 on the pressure side basically have a constant wall thickness D along their extent from the leading edge 18 to the trailing edge 20. The wall thickness D, however, increases in the connecting region 26 on account of the concave fillet-like transition to the support ribs 24, so that these regions B have greater wall thicknesses than the regions A in which the cavities 31 existing inside 22 the turbine blade 12 are arranged. Moreover, there are mass accumulations C at the transition.

In the regions B with greater wall thicknesses D, or close to the connecting regions 26, the coating 32 is applied thicker than in the regions A in which the blade walls 14, 16 of the turbine blade 12 have lesser wall thicknesses D, or in which the blade walls 14, 16 define the inner cavities 31, Local coating accumulations 33 which are so formed, project slightly from the surface by the layer thickness of the coating, viewed along the cross section, continuously increasing to the desired thicker dimension E, and, after reaching the maximum, continuously decreasing again to the customary dimension F. This is schematically outlined in FIG. 1. The factor of thinner coating to thicker coating is in the order of magnitude of at least 1.1 or at least 1.2.

Since the airfoil section 10, which is formed by a basic body 40, customarily has a desired aerodynamic profiling, insignificant bumps 33, the aerodynamic influences of which are negligible, are produced on account of the local layer thickness change.

Figure 2:
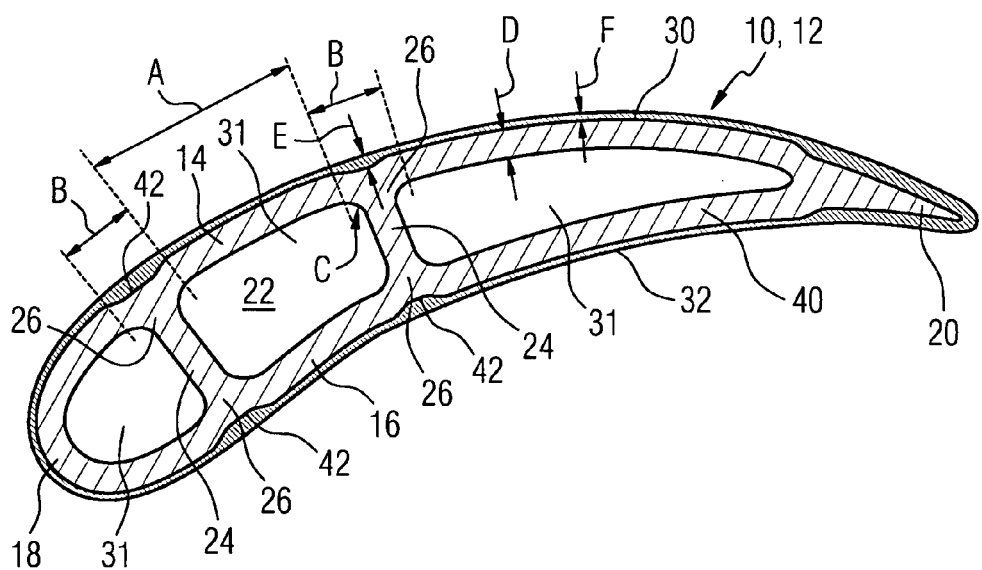
FIG. 2 shows a cross section through an alternatively formed blade section according to a further development.

The turbine blade 12 which is shown in cross section in FIG. 2, shows a remedy for this. In the region 26 of the connections of support ribs 24 to the blade walls 16, 14, recesses 42, which extend over the height of the airfoil section 10, are provided in the basic body 40, as a result of which a contour of the coated turbine blade 12, which is especially aerodynamic on account of the absence of bumps, can be achieved by realization of the inventive idea. Mass accumulations in the connecting regions 26 are also reduced as a consequence.

For cooling the turbine blade 12, a cooling medium can flow inside 22 or in the cavities 31 of the turbine blade 12, as the case may be, which, by using known cooling systems like convention cooling, impingement cooling and/or film cooling, adjusts the temperatures in the material of the basic body 40 in such a way that the latter, at even higher temperatures of the hot working medium, nevertheless achieves an especially long service life.

On account of the still comparatively thin coating 32, the recesses 42 are shown disproportionally large in FIG. 2. In reality, the depth of these recesses is in the order of magnitude of 120 µm and less.

By the proposed means, the thermal gradient in the connecting region 26 can be homogenized, as a result of which the potentially damaging material stresses can be reduced. Furthermore, the different coating thickness can also have an influence on the natural oscillation characteristic of the turbine blade.

A turbine blade 12, the blade walls 14, 16 of which can be divided into sections with locally adapted material temperatures, in all is disclosed by the invention. The cooler material temperatures of the blade walls 14, 16 are at the points at which the support ribs 24 merge into the blade walls 14, 16. The regions with higher material temperatures of the blade walls 14, 16 are at the positions at which cavities 31 are arranged inside the blade walls 14, 16. According to the invention, this is achieved by means of a coating 32, especially by means of a ceramic thermal barrier coating with different layer thicknesses E, F, which allow the different material temperatures of the blade walls 14, 16. Especially that region B of the surface 30 of the blade wall 14, 16 which faces the working medium and which lies opposite a rib 24 which is formed inside 22, has a thicker thermal barrier coating than that region A of the surface 30 of the blade wall 14, 16 which is coolable by means of a cooling medium which is flowable in the cavities 31. This leads to a homogenization of the material temperature in the connecting regions 26 and along the blade wall from leading edge 18 to trailing edge 20, which affects the turbine blade 12 with life-prolonging effect.

The invention claimed is:

1. A turbine blade for a stationary axial-flow gas turbine engine, comprising:
   a hollow airfoil section formed by a suction side blade wall and a pressure side blade wall;
   a coating arranged on an outer surface of the pressure side and suction side blade walls that face a working medium; and
   a support rib arranged in a connecting region inside the hollow airfoil section that connects the pressure side and suction side blade walls, wherein a thickness of the coating in a region of the outer surface opposite each of the connecting regions has a greater layer thickness than a further region of the outer surface of the blade walls that define a cavity inside the hollow airfoil section.

2. The turbine blade as claimed in claim 1, wherein a cooling medium flows within the hollow airfoil section.

3. The turbine blade as claimed in claim 1, wherein the airfoil section is formed by a basic body, to which the coating is applied, and
   in which recesses are provided in the basic body in the regions in which the coating has the greater layer thickness.

4. The turbine blade as claimed in claim 3, wherein the recesses have a depth dimension that approximately corresponds to the difference between the thicker and the thinner coating, in order to achieve an especially aerodynamic surface of the coating which is exposed to flow of the working medium.

5. The turbine blade as claimed in claim 4, wherein the blade wall on the suction side and the blade wall on the pressure side meet in the region of a trailing edge, and the coating on at least one of these regions of the blade walls is thicker than in the region which lies upstream directly in front of the region.

6. The turbine blade as claimed in claim 5, wherein the greater layer thickness portion of the coating is thicker than a thinner portion by a factor of 1.1.

7. The turbine blade as claimed in claim 5, wherein the greater layer thickness portion of the coating is thicker than a thinner portion by a factor of 1.2.

8. An axial-flow gas turbine engine, comprising:
a rotatably mounted rotor arranged along a rotational axis of the engine;
a plurality of compressor blades arranged on the rotor to form an axial-flow compressor section, wherein a working medium is compressed;
a combustion section that receives the compressed working medium, mixes the compressed working medium with a fuel and combusts the mixture to form a hot working medium;
a plurality of hollow turbine blades and vanes arranged to form an axial-flow turbine section where the turbine section receives the hot working medium and expands the hot working medium, wherein the plurality of turbine blades and vanes have:
a hollow airfoil section formed by a suction side blade wall and a pressure side blade wall,
a coating arranged on an outer surface of the pressure side and suction side blade walls that faces the hot working medium, and
a support rib arranged in a connecting region inside the hollow airfoil section that connects the pressure side and suction side blade walls, where a thickness of the coating in a region of the outer surface opposite each of the connecting regions has a greater layer thickness than a further region of the outer surface of the blade walls that define a cavity inside the hollow airfoil section.

9. The engine as claimed in claim 8, wherein a cooling medium flows within the hollow airfoil section.

10. The engine as claimed in claim 9, wherein the airfoil section is formed by a basic body, to which the coating is applied, and
in which recesses are provided in the basic body in the regions in which the coating has the greater layer thickness.

11. The engine as claimed in claim 10, wherein the recesses have a depth dimension that approximately corresponds to the difference between the thicker and the thinner coating, in order to achieve an especially aerodynamic surface of the coating which is exposed to the hot working medium.

12. The engine as claimed in claim 11, wherein the blade wall on the suction side and the blade wall on the pressure side meet in the region of a trailing edge, and the coating on at least one of these regions of the blade walls is thicker than in the region which lies upstream directly in front of the region.

13. The engine as claimed in claim 12, wherein the greater layer thickness portion of the coating is thicker than a thinner portion by a factor of 1.1.

14. The engine as claimed in claim 12, wherein the greater layer thickness portion of the coating is thicker than a thinner portion by a factor of 1.2.

* * * * *